(12) United States Patent
Bell

(10) Patent No.: US 11,888,580 B2
(45) Date of Patent: Jan. 30, 2024

(54) NEAR-OMNIDIRECTIONAL OPTICAL COMMUNICATION SYSTEM

(71) Applicant: Naval Information Warfare Center, Pacific, San Diego, CA (US)

(72) Inventor: Ryan A Bell, Mount Pleasant, SC (US)

(73) Assignee: United States of America as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/706,017

(22) Filed: Mar. 28, 2022

(65) Prior Publication Data

US 2023/0308203 A1    Sep. 28, 2023

(51) Int. Cl.
| | |
|---|---|
| H04B 10/40 | (2013.01) |
| H04B 10/11 | (2013.01) |
| H04J 14/00 | (2006.01) |
| H04B 10/80 | (2013.01) |
| H04B 10/50 | (2013.01) |

(52) U.S. Cl.
CPC .......... *H04J 14/002* (2013.01); *H04B 10/40* (2013.01); *H04B 10/501* (2013.01); *H04B 10/80* (2013.01); *H04B 10/11* (2013.01)

(58) Field of Classification Search
None
See application file for complete search history.

(56) References Cited

U.S. PATENT DOCUMENTS

| | | | | |
|---|---|---|---|---|
| 5,146,230 A | * | 9/1992 | Hules | H01Q 3/242 342/372 |
| 6,362,795 B2 | * | 3/2002 | Ishikawa | H01Q 19/062 343/753 |
| 6,950,061 B2 | * | 9/2005 | Howell | H01Q 3/26 342/359 |
| 8,515,294 B2 | * | 8/2013 | Britz | H04B 10/60 398/124 |

(Continued)

FOREIGN PATENT DOCUMENTS

| | | | |
|---|---|---|---|
| CN | 209472105 U | * | 10/2019 |
| CN | 109687158 B | | 4/2020 |

(Continued)

OTHER PUBLICATIONS

Palais, Joseph, Fiber Optic Communications, 2005, Pearson Education, Inc., pp. 47-49 (Year: 2005).*

(Continued)

*Primary Examiner* — Jai M Lee
(74) *Attorney, Agent, or Firm* — Naval Information Warfare Center Atlantic; Kyle Eppele; Paul C. Oestreich

(57) ABSTRACT

The present invention relates to a communication system for receiving electromagnetic radiation (EMR) signals from a plurality of sources or directions. A communication system comprises a transmission section surrounding an antenna section. The transmission section can be made of concentric layers of lens elements, mirror elements, or refraction medium. The layers allow incoming EMR to be directed to the antenna section through reflection or refraction. The antenna section can be made of a plurality of antenna (Continued)

elements such that each antenna element detects incoming EMR signals from different angles of origin even when the signals are received simultaneously.

16 Claims, 5 Drawing Sheets

(56) References Cited

U.S. PATENT DOCUMENTS

| | | | | |
|---|---|---|---|---|
| 10,539,396 | B1* | 1/2020 | Plunk | H01Q 21/064 |
| 10,581,525 | B2* | 3/2020 | Velazco | H04B 10/66 |
| 10,770,790 | B1* | 9/2020 | Mahanfar | H01Q 3/34 |
| 10,811,768 | B2* | 10/2020 | Russell | H01Q 15/08 |
| 10,897,286 | B2* | 1/2021 | Liang | H04B 7/0452 |
| 11,569,583 | B2* | 1/2023 | Hormis | H01Q 15/08 |
| 2002/0067314 | A1* | 6/2002 | Takimoto | H01Q 3/14 |
| | | | | 343/711 |
| 2021/0306071 | A1* | 9/2021 | Velazco | H04B 10/118 |

FOREIGN PATENT DOCUMENTS

| | | |
|---|---|---|
| CN | 107627611 B | 5/2020 |
| CN | 111830737 A | 10/2020 |
| CN | 111262044 B | 8/2021 |
| JP | 2022543045 A | 10/2022 |
| RU | 2738689 C2 | 12/2020 |

OTHER PUBLICATIONS

Wikipedia, Luneburg lens, 2011 (Year: 2011).*
John Wallace, "3D-printed gradient-index Lüneburg lens is fabricated at optical wavelengths", Laser Focus World, Dec. 3, 2020.

* cited by examiner

NEAR-OMNIDIRECTIONAL OPTICAL COMMUNICATION SYSTEM

STATEMENT REGARDING FEDERALLY SPONSORED RESEARCH OR DEVELOPMENT

The United States Government has ownership rights in this invention. Licensing and technical inquiries may be directed to the Office of Research and Technical Applications, Naval Information Warfare Center Atlantic, Code 70F00, North Charleston, SC, 29419-9022; voice (843) 218-3495; email ssc_lant_T2@navy.mil. Reference Navy Case Number 114,402.

BACKGROUND OF THE INVENTION

The present invention relates to a near-omnidirectional optical communication receiver. Optical communication methods between non-static point-to-point locations typically use a series of mirrors, stabilizers, and control systems to effectively allow the devices to be aimed at one another to complete the communication link. The primary challenges associated with this method of communication require high fidelity control systems and an inherent inability to receive multiple signals because otherwise the original intended communication link would have to be broken.

SUMMARY OF THE INVENTION

According to an illustrative embodiment of the present disclosure, a communication system comprises a transmission section surrounding an antenna section. The transmission section can be made of concentric layers of lens elements, mirror elements, or refraction medium. The layers allow incoming electromagnetic radiation (EMR) to be directed to the antenna section through reflection or refraction. The antenna section can be made of a plurality of antenna elements such that each antenna element detects incoming EMIR signals from different angles of origin even when the signals are received simultaneously. Signal information can then be sent to other devices through input/output (I/O) lines coupled to the antenna section.

According to a further illustrative embodiment of the present disclosure, an antenna section can be created with a variable number and size of individual antenna elements. Exemplary embodiments can include a larger number of antenna elements to increase accuracy of signal detection and direction finding. Antenna elements can be made in a variety of sizes to improve accuracy or manufacturing simplicity.

According to a further illustrative embodiment of the present disclosure, communication systems can be mounted onto a stationary or mobile platform. A plurality of communication systems can be used to provide detection coverage of specific angles and can include overlapping coverage. Coverage is not needed for angles where signal detection is not wanted or expected.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
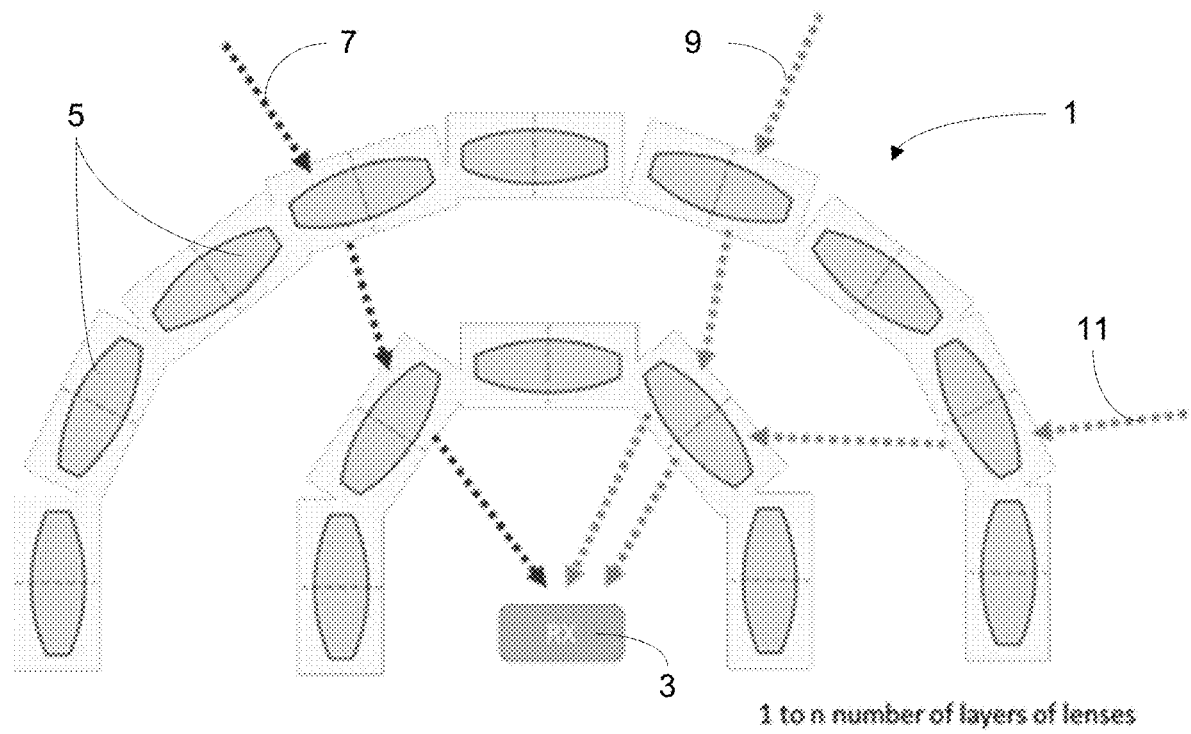
FIG. 1 shows an exemplary transmission section surrounding an antenna.

FIG. 1 shows a cross-sectional view an exemplary communication system 1 with a transmission section 5 surrounding an antenna section 3. Exemplary transmission sections 5 can be made with a variety of transmission elements operating in tandem (e.g., a plurality of lens or mirror elements arranged in a plurality of rows or rings) or a continuous refraction medium shaped to refract EMR in a toward a predetermined area or point within the transmission section 5 (e.g., a Lüneburg lens). Transmission section 5 can completely surround the antenna section so that it can refract a plurality of optical paths 7, 9, 11 such that regardless of the incoming direction of each optical path, the optical path always ends at antenna section 3. The thickness of transmission section 5 can be scaled based on the size of antenna section 3. The size of antenna section 3 may be dependent on the properties of the chosen antenna (e.g., particular antenna elements may have a minimum size), so the thickness of transmission section 5 can be increased or decreased to reach a predetermined lens to antenna ratio. A wide variety of ratios can be used as long as the transmission section is thick enough to refract all incoming EMR to reach antenna section 3. In exemplary embodiments, the transmission section can be made with a gradient refractive index such that the index decreases radially from the center-most portion to the outer-most portion of the transmission section. In these embodiments, the gradient refractive index facilitates bending incoming EMR towards the antenna section and prevents backscattering of EMR at the outer surface of the transmission section.

Figure 2:
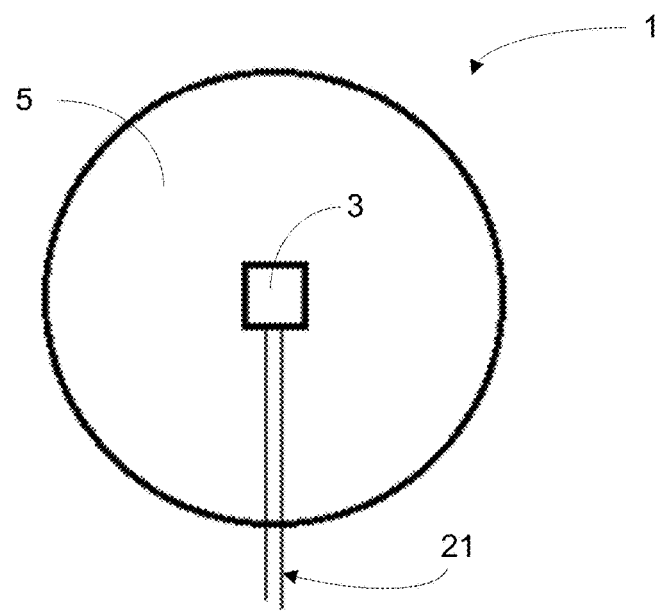
FIG. 2 shows a spherical transmission surrounding an antenna.

FIG. 2 shows a cross-sectional view of an exemplary communication system 1 with a spherical transmission section 5 surrounding an antenna section 3. Input/output (I/O) lines 21 allow antenna section 3 to transmit information and data to other systems (not shown). In exemplary embodiments, transmission section 5 can be manufactured around antenna section 3 such that antenna section 3 is embedded within transmission section 5. In other exemplary embodiments, antenna section 3 can be embedded within transmission section 5 after the transmission section is partially constructed, then transmission section 5 can be completed. In other exemplary embodiments, antenna section 3 can be embedded within transmission section 5 after the transmission section is fully constructed.

Figure 3:
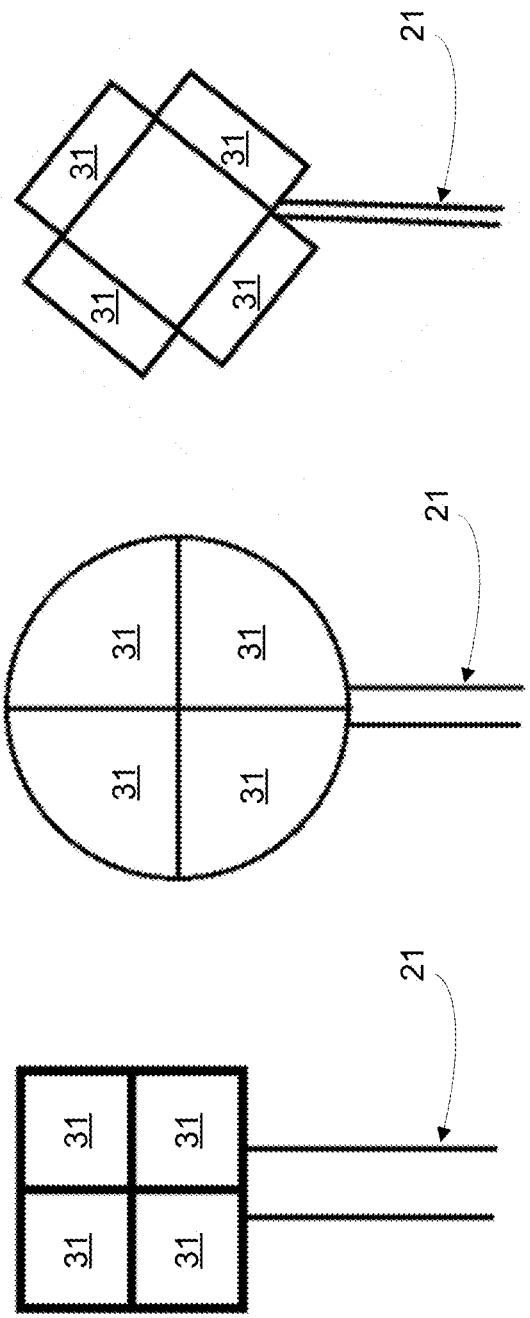
FIG. 3 shows a plurality of antenna section alternatives.

FIG. 3 shows cross-sectional views of a plurality of antenna section 3 alternatives. In exemplary embodiments, antenna section 3 can be made with a plurality of antenna elements 31. By using multiple antenna elements 31, a user can determine the direction of incoming EMR based on which antenna elements received EMIR. Antenna elements 31 can each be constructed with differing shapes to optimize receiving capability at the cost of manufacturing complexity. Using rectangular antenna elements 31 (e.g., the left embodiment shown in FIG. 3) can be the simplest to design and manufacture. A spherical antenna section 3 (e.g., the middle embodiment shown in FIG. 3) can be the most efficient and accurate, but due to the difficulty of designing and manufacturing this type of antenna section 3 a user may prefer to approximate a cube or sphere with rectangular antenna elements 31 (e.g., the right embodiment shown in FIG. 3). For situations where directional detection is important, exemplary embodiments can use larger numbers of antenna elements to increase the accuracy of directional detection. For example, one can decrease the size of individual rectangular antenna elements and increase the number of total number of elements used such that the overall size of the antenna section stays constant while also increasing the measurement fidelity. For situations where directional detection is needed from specific directions, exemplary embodiments can be shaped with antenna elements to match the expected environment. For example, a hemispherical antenna section 3 can be used for surface based systems because transmissions will only be received along or above the surface. For elevated operating environments (e.g., system mounted on a raised structure or aerial systems), a fully spherical antenna section 3 allows transmissions to be received from any direction. In these embodiments, the layers of the transmission section can match the general shape such that the transmission section only covers the expected angles of signal detection. For example, a hemispherical antenna section does not need refractive material below the spherical cap, so condensing the transmission section to a hemispherical shape can simply production and reduce material costs.

Figure 4:
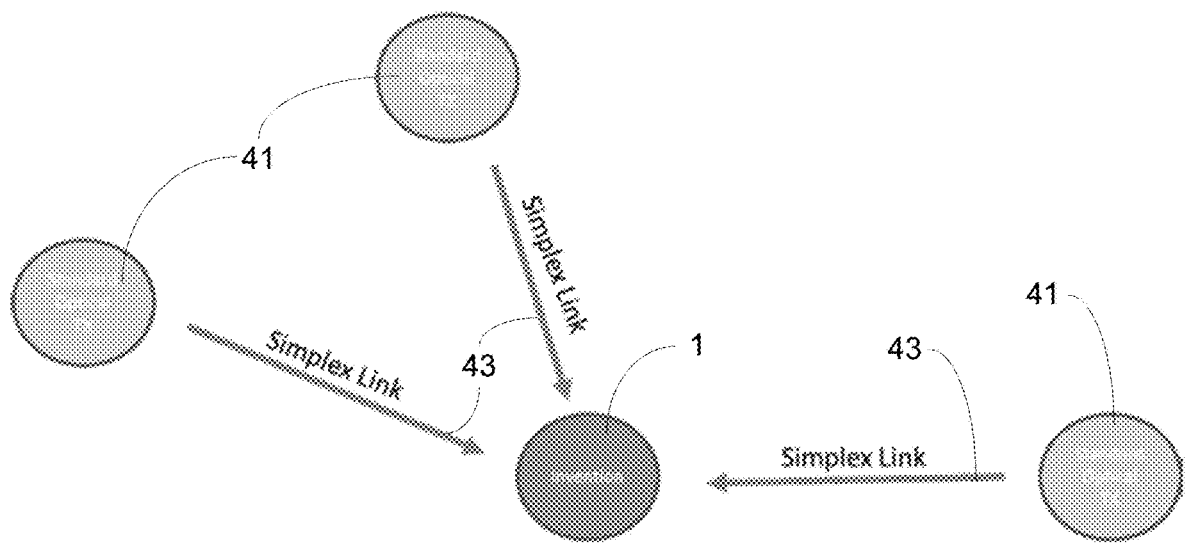
FIG. 4 shows an exemplary system used in a simplex configuration.

FIG. 4 shows an exemplary system 1 used in a simplex configuration with a plurality of transmitters 41. In this configuration, system 1 receives signals from transmitters through corresponding simplex connections 43. System 1 is configured to receive transmissions from a plurality of angles (e.g. as shown in FIG. 1) so that the position of transmitters 41 with respect to system 1 can vary.

Figure 5:
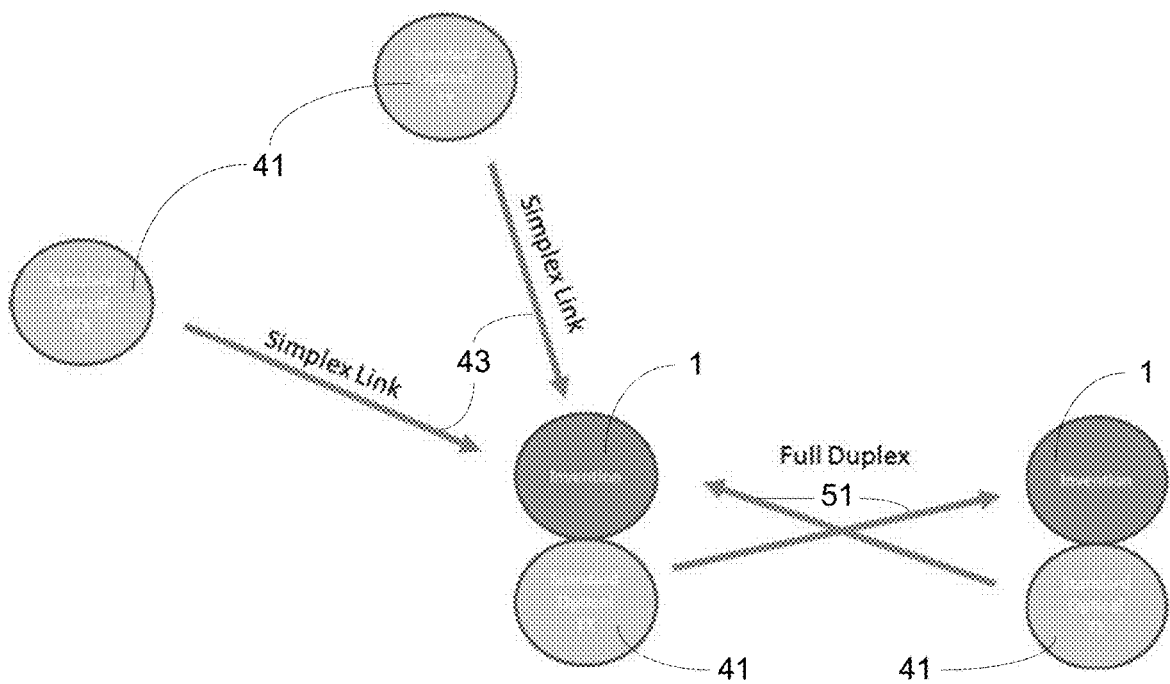
FIGS. 5 and 6 shows exemplary systems used in combined simplex and duplex configurations.

FIG. 5 shows an exemplary system 1 with a combined simplex and duplex configuration with a plurality of transmitters 41. In this configuration, system 1 can receive signals from transmitters through corresponding simplex connections 43. System 1 is configured to receive transmissions from a plurality of angles (e.g. as shown in FIG. 1) so that the position of transmitters 41 with respect to system 1 can vary. In addition, each system 1 can be paired with a transmitter 41 to enable duplex connections 51 between multiple systems 1 to allow systems 1 operate in conjunction with each other.

Figure 6:
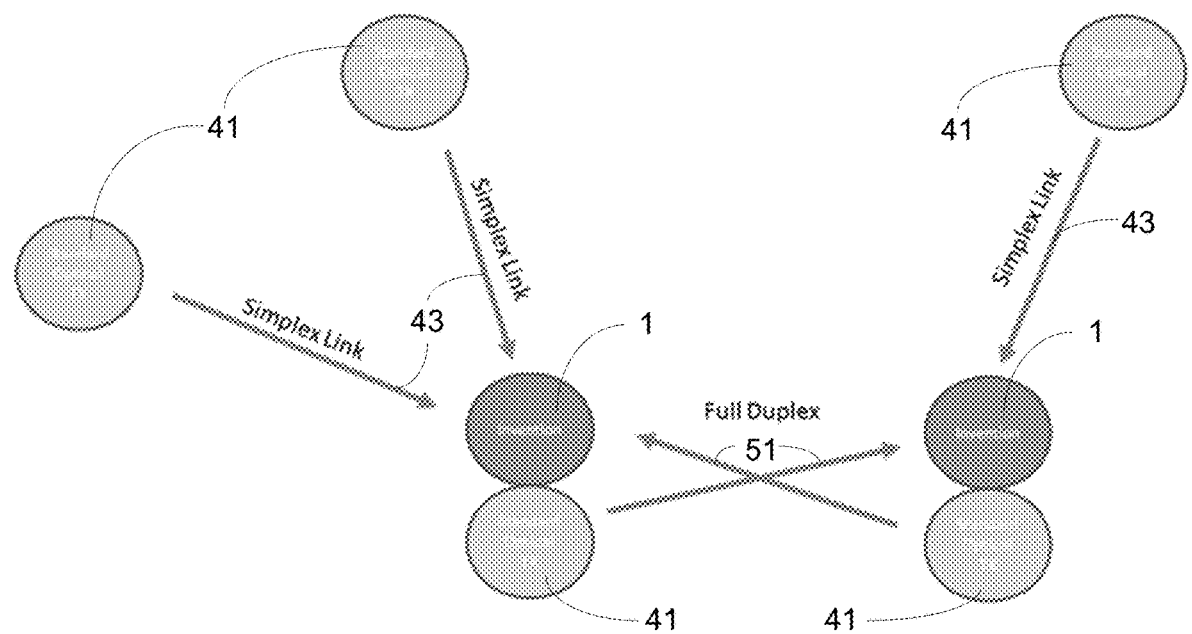

FIG. 6 shows an exemplary system 1 with a combined simplex and duplex configuration with a plurality of transmitters 41. In this configuration, system 1 can receive signals from transmitters through corresponding simplex connections 43. System 1 is configured to receive transmissions from a plurality of angles (e.g. as shown in FIG. 1) so that the position of transmitters 41 with respect to system 1 can vary. In addition, each system 1 can be paired with a transmitter 41 to enable duplex connections 51 between multiple systems 1 to allow systems 1 operate in conjunction with each other. Each system 1 can independently receive transmissions from transmitters 41 so that in combination the systems 1 can provide a larger target/reception area.

Figure 7:
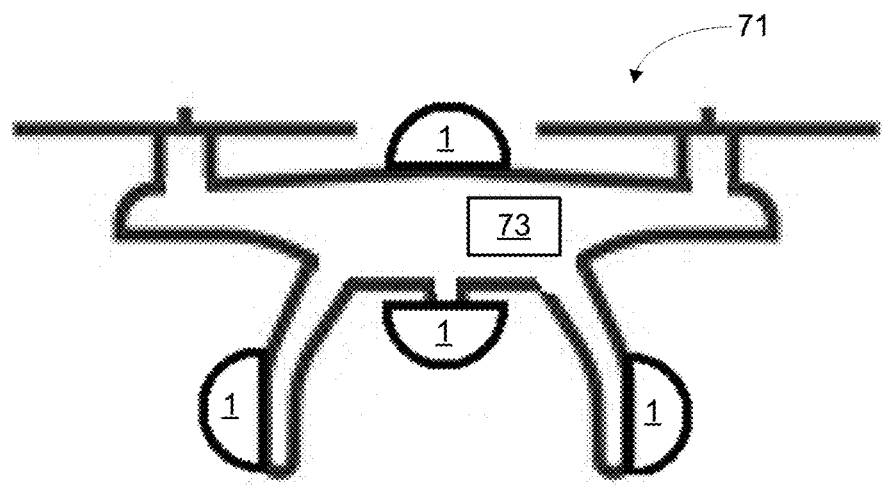
FIG. 7 shows a plurality of exemplary systems installed on mobile platform.

FIG. 7 shows a plurality of exemplary systems 1 installed on platform 71. In exemplary embodiments, a plurality of systems 1 can be used in tandem allows more precise communication and detection. Each system 1 can be configured to receive from a different field of view. In these embodiments, each system 1 can comprise non-spherical antenna elements because no single system needs to detect signals from every direction. In exemplary embodiments, the plurality of systems 1 can be configured to receive signals from overlapping fields of view to ensure there are no blind spots or to provide redundant detection for improved accuracy. For example, the platform 71 can have vertically oriented systems 1 to provide detection around the entirely of platform 71 and can also have horizontally oriented systems 1 to provide redundant detection capabilities. Electronics section 73 can include a variety of standard electronics (e.g., a processor, power source, etc.), in addition to at least one transmitter to allow the systems 1 to operate with systems outside of the platform (e.g., additional platforms) via duplex links. Electronics section 73 can be electrically coupled to each system 1 by U/O lines to process signals and allow the systems to communicate with each other. For mobile platforms (e.g., aerial vehicles), signals detected and processed can trigger platform responses (e.g., maneuvering or orienting the platform, landing procedures, etc.).

Figure 8:
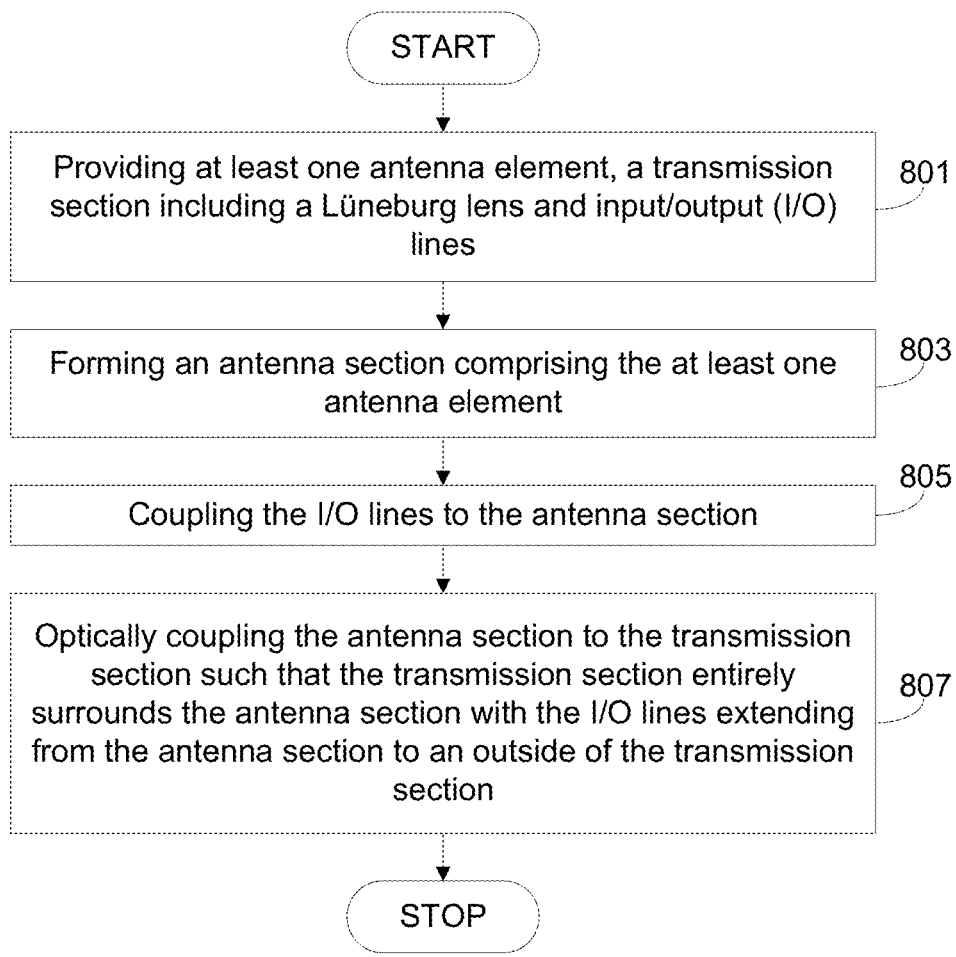
FIG. 8 shows an exemplary method for manufacturing communication systems.

FIG. 8 shows an exemplary method for manufacturing communication systems. At step 801, providing at least one antenna element, at least one transmission medium, and input/output (I/O) lines. In exemplary embodiments, each of the at least one transmission medium can be a mirror, a lens, or a refraction medium. At step 803, forming an antenna section comprising the at least one antenna element. In exemplary embodiments, the at least one antenna element can be oriented to face a particular direction. In exemplary embodiments, the at least one antenna element can be made to have a variety of shapes (e.g., cuboids, spherical segments, spherical wedges, etc.). In exemplary embodiments having a plurality of antenna elements, the antenna elements can be arranged to form a particular shape when combined (e.g., cuboids forming a cube around an empty interior, spherical wedges forming a sphere). At step 805, coupling the I/O lines to the antenna section. Each of the at least one antenna elements can be configured to transmit signal info through the I/O lines. At step 807, coupling the antenna section to the transmission medium such that the transmission medium forms a transmission section around the antenna section. In exemplary embodiments, the transmission section can be formed before any transmission medium is coupled to the antenna section. In alternative exemplary embodiments, each transmission medium can be directly coupled to the antenna section such that the transmission section is built around the antenna section. In at least some of the embodiments, the transmission medium can be additively manufactured around the antenna section.

Although the invention has been described in detail with reference to certain preferred embodiments, variations and modifications exist within the spirit and scope of the invention as described and defined in the following claims.

The invention claimed is:
1. A communication system comprising:
a transmission section;
an antenna section disposed completely within the transmission section;

wherein the transmission section comprising a spherical Lüneburg lens configured to bend electromagnetic radiation (EMR) towards the antenna section;
wherein the antenna section comprises at least one antenna element; and
input/output (I/O) lines coupled to the antenna section, wherein the I/O lines are disposed through the transmission section such that the I/O line extend outside of the transmission section.

2. The system of claim 1, further comprising at least one transmitter electrically coupled to the I/O lines.

3. The system of claim 1, wherein the transmission section comprises a plurality of lens elements arranged in at least one concentric layer around the antenna section.

4. The system of claim 1, wherein the transmission section comprises a continuous refractive medium.

5. The system of claim 4, wherein the refractive medium comprises a gradient index lens having a refractive index that decreases radially from a center-most surface of the transmission section to the outer-most surface of the transmission section.

6. The system of claim 1, wherein the at least one antenna element comprises a plurality of spherical subsections that together form a sphere.

7. A communication platform comprising:
at least one communication system comprising:
a transmission section comprising a spherical Lüneburg lens; and
an antenna section disposed entirely within the transmission section;
wherein the transmission section is configured to bend electromagnetic radiation (EMR) towards the antenna section;
wherein the antenna section comprises at least one antenna element; and
an electronics section electrically coupled to the at least one communication system.

8. The system of claim 7, wherein the at least one communication system comprises a first and a second communication system coupled to a top section and a bottom section of the communication platform, respectively;
wherein the first and second communication systems are configured to detect electromagnetic radiation (EMR) from an upper field of view and a bottom field of view, respectively.

9. The system of claim 8, wherein the at least one communication system comprises a third and a fourth communication system coupled to a left section and a right section of the communication platform, respectively;
wherein the third and fourth communication systems are configured to detect electromagnetic radiation (EMR) from an left field of view and a right field of view, respectively.

10. The system of claim 9, the communication platform comprising an aerial vehicle.

11. The system of claim 7, the communication platform comprising a ground mounted tower, wherein the at least one communication system is coupled to an upper section of the tower.

12. The system of claim 7, the electronics section comprising at least one transmitter.

13. A method of manufacturing communication systems comprising:
providing at least one antenna element, a transmission section including a Lüneburg lens and input/output (I/O) lines;
forming an antenna section comprising the at least one antenna element;
coupling the I/O lines to the antenna section; and
optically coupling the antenna section to the transmission section such that the transmission section entirely surrounds the antenna section with the I/O lines extending from the antenna section to an outside of the transmission section.

14. The method of claim 13, wherein the at least one antenna element comprises a plurality of spherical subsections that together form a sphere.

15. The method of claim 13, wherein the transmission section comprises a plurality of lens elements arranged in at least one concentric layer around the antenna section.

16. The method of claim 13, wherein the transmission section comprises a continuous refractive medium comprising a gradient index lens having a refractive index that decreases radially from a center-most surface of the transmission section to the outer-most surface of the transmission section.

* * * * *